Patented Aug. 29, 1944

2,357,101

UNITED STATES PATENT OFFICE 2,357,101

TITANIUM PIGMENTS AND PROCESS FOR PRODUCING THE SAME

John Albert Geddes, Richardson Park, Del., assignor to E. I. du Pont de Nemours & Company, Wilmington, Del., a corporation of Delaware No Drawing. Application August 7, 1941, Serial No. 405,784

5 Claims. (Cl. 106—300)

This invention relates to the production of titanium pigments, and more particularly to the manufacture of titanium oxide having improved and special pigmentary properties.

More specifically, it relates to the production of titanium oxide pigments usefully adaptable in coating compositions, especially enamel paints of the air drying and baking type, to obtain films having high gloss and gloss retention characteristics, together with excellent color, weather resistance and freedom from chalking and yellowing.

As is known, titanium pigments employed in paints and similar coating compositions tend to chalk and fade badly on exposure for a relatively short time to weathering influences or light. In addition, their use in interior paint formulations, such as in air-dried enamel paints or high temperature baking enamels, has been accompanied with certain disadvantages, in that they appear to promote a marked and objectionable tendency toward film discoloration or yellowing. Again, when these types of enamel paints are applied to wood, metal, oil cloth, linoleum, paper, etc., they are characteristically poor in gloss, and, in many instances, are of objectionably dull, matte appearance. The poor gloss retention properties of such films is apparent after their exposure to atmospheric conditions for a relatively short time period, which causes them to lose whatever original glossy appearance they may have possessed.

With a view to improving the properties of titanium pigments and in attempts to overcome to some extent their inherent disadvantages, precipitation upon and treatment of the pigments with aluminum hydroxide has been proposed, by reacting aluminum sulfate with an alkaline agent, such as sodium carbonate. In such type of treatment, however, large quantities of objectionable inorganic soluble salts, e. g., sodium sulfate, are also precipitated which, in view of the highly adsorptive nature of the pigment, persistently remain in the finished pigment, and this in spite of repeated washing of the treated pigment in a vain attempt to completely remove them. These soluble salts, when present in the final pigment, are very objectionable, because when incorporated in coating films, they impart exceptionally poor durability and weathering resistance characteristics to such films. Thus, pigments treated in accordance with such procedures become useless in coating formulations to be exteriorly applied and subjected to weathering influences. Furthermore, such pigments also exhibit even poorer gloss and gloss retention characteristics than the untreated pigment. Also, the treatment of a previously calcined $TiO_2$ pigment with a solution of an unreacted, basic aluminum salt, especially a highly basic aluminum chloride, has been proposed, as has the addition to such pigments of separately-precipitated, purified aluminum hydroxide. The resulting pigments, however, fail to afford a product which is completely satisfactory or a pigment having desired gloss and gloss retention properties.

It has been found that these and other disadvantages which exist in prior titanium oxide pigments can be effectively overcome. An object of the invention, therefore, is to provide a novel, relatively simple and economical method for easily attaining this result. Additional objects are to provide a process for treating titanium pigments in general and titanium oxide in particular, to improve the durability characteristics thereof, whereby such pigments are rendered stable, non-reactive and highly resistant toward weathering, chalking or discoloration; to provide a titanium pigment which is exceedingly durable in nature because relatively free from objectionable soluble compounds, especially inorganic salts; and to provide a product which is manifestly superior in color and tint retention and inherently possesses high gloss and gloss retention characteristics, to become eminently fitted for coating composition use, especially in enamel types of paints of the air drying or high temperature baking types wherein these properties are essential.

These and other objects are obtainable in this invention, which comprises subjecting a previously calcined titanium pigment, and especially titanium oxide, to treatment with a water-soluble aluminum salt of an organic acid and a divalent metal hydroxide; in order to intimately associate with said pigment a relatively small amount of an insoluble, organic, basic aluminum compound and its resulting reaction product.

In a more specific embodiment, the invention comprises incorporating in a suspension of a previously calcined, wet-milled and dispersed titanium oxide pigment, a small amount of a normal or basic organic aluminum salt, such as aluminum acetate, and a sufficient amount of a water-soluble alkaline earth metal hydroxide to react with said salt and adjust the pH value of the resulting mixture to not less than about 7, and thereafter filtering, drying and recovering the resulting surface-treated pigment.

In a preferred adaptation of the invention, there is added to or otherwise incorporated in an aqueous slurry suspension of previously calcined titanium oxide pigment a relatively small amount, from, say, about 0.01% to about 10%, and preferably from about 0.1% to about 1% (calculated as $Al_2O_3$ and based on the weight of the pigment) of a water-soluble aluminum salt of an organic acid, preferably basic aluminum acetate. The pigment thus treated may comprise the product which results from the hydrolysis of titanium salt solutions in accordance with, for instance, the methods described in U. S. Reissue Patents 18,854, 18,790, or in U. S. Patent 2,062,133. Preferably, and to obtain optimum results hereunder, I apply said salt treatment to a previously dispersed or deflocculated $TiO_2$ pigment slurry which has a pH value of about 10 and contains as an essential ingredient thereof a small amount of alkali metal compound, such as sodium hydroxide or carbonate, etc. A suitable slurry of this type comprises those resulting from the wet grinding or elutriation systems described in U. S. Patent 1,937,037. After incorporating sufficient aluminum acetate or like salt in the pigment slurry to reduce its pH, preferably, to about 5 or 6, the resulting mixture is then thoroughly agitated. Thereafter, an amount of water-soluble alkaline earth metal hydroxide, preferably barium hydroxide, sufficient to coagulate or flocculate said slurry and adjust its pH to not less than 7, the neutral point, and preferably from about 9 to about 11, is then admixed with said slurry. As a result of such treatment, there becomes intimately associated with said pigment a small amount of an insoluble, basic organic compound, especially highly basic aluminum acetate, together with the reaction product thereof by reason of divalent metal hydroxide presence, e. g., barium acetate. The resulting final pigment slurry is then allowed to settle, the supernatant liquor being then decanted off, the pH adjusted to about 7.2 to 7.5, preferably with acetic acid, and the surface-treated pigment is then washed, dried or otherwise suitably finished prior to use. Drying is preferably effected at temperatures above substantially 100° C., but not in excess of about 150° C., in order to avoid decomposing or otherwise adversely affecting the treating agent. The final pigment, being substantially completely free from any objectionable soluble salts, can then be used in all types of pigment applications, especially in coating composition formulations, such as in enamels of the air drying or high temperature baking type, wherein it will exhibit improved color and tinting strength characteristics, together with superior gloss and gloss retention properties. Said pigment will be also found free from any tendency to yellow or discolor, even after subjection for a prolonged period to the excessively high temperatures encountered in such high temperature baking enamel operations. Similarly, the resulting films will be exceedingly durable in nature, this being readily apparent upon subjecting the films to weathering and exposure for prolonged periods under outdoor conditions.

To a more complete understanding of my invention, the following specific examples are given, each merely being illustrative and not in limitation of the invention:

EXAMPLE I

One portion (1166 parts by weight) of an aqueous dispersion of calcined, wet-milled, pigment titanium dioxide, containing 14.2% titanium dioxide by weight and sodium hydroxide in quantity sufficient to provide a pH of 9.6, was mixed with 0.9 part by weight of a basic aluminum acetate solution containing basic aluminum acetate in an amount equivalent to 0.09 part by weight $Al_2O_3$, i. e., the basic aluminum acetate was added in an amount equivalent to 0.054% $Al_2O_3$ on the basis of the titanium oxide weight. The pigment dispersion was agitated thoroughly and there was then added thereto 41 parts by weight of a barium hydroxide solution containing 25 grams $$Ba(OH)_2 \cdot 8H_2O$$

per liter, whereby the pigment was coagulated and a slurry of 11.1 pH was had. The slurry was allowed to settle, the supernatant liquor was decanted therefrom, the slurry was adjusted to a pH of 7.2 by addition of 5% acetic acid thereto, it was filtered, and the resultant treated pigment was dried at a temperature of 125° C. and disintegrated by passage through a squirrel cage disintegrator. This pigment was designated Sample 1–A, to be hereinafter referred to.

A second portion of the same type of aqueous dispersion of calcined, wet-milled, pigment titanium dioxide, containing 14.2% titanium dioxide by weight and sodium hydroxide in quantity sufficient to provide a pH of 9.6, was treated in the same manner as the portion employed in obtaining Sample 1–A above, except that no basic aluminum acetate was added thereto. The resulting product (according to prior practice) was designated Sample 1–B, which also will be referred to hereinafter.

EXAMPLE II

A 15 liter portion of a coagulated slurry of wet-milled, calcined, pigment titanium dioxide, containing 180 grams titanium dioxide per liter, was mixed with 122 cc. of an aluminum acetate solution containing aluminum acetate in an amount equivalent to 6.1 grams $Al_2O_3$, i. e., the aluminum acetate was added in an amount equivalent to 0.23% $Al_2O_3$ on the basis of the titanium oxide weight. The pigment suspension was agitated thoroughly and 2 liters of a barium hydroxide solution containing 20 grams $$Ba(OH)_2 \cdot 8H_2O$$

per liter was added thereto to raise the pH of the coagulated slurry to 7.2. The slurry was then filtered, and the treated pigment was then dried at a temperature of 115° C. and disintegrated by passage through a squirrel cage disintegrator. This product was designated as Sample 2–A.

A second portion of the above coagulated slurry of wet-milled, calcined, pigment titanium dioxide was treated in the same fashion as the portion employed in obtaining Sample 2–A, except that the aluminum acetate addition step was omitted, according to prior practice. This product was designated Sample 2–B.

15 parts by weight of $Al_2(SO_4)_3 \cdot 18H_2O$ was dissolved in approximately 250 parts by weight of water. Dilute ammonium hydroxide was then slowly added with good agitation until the slurry had a pH of about 7.0 to 7.2. The precipitated, separately-prepared, hydrated aluminum oxide was then washed by decantation and by filtering to remove soluble salts. The purified, wet precipitate was then reslurried in sufficient water to give a total amount of about 250 parts by weight. This suspension was then added to a third portion of the aforesaid coagulated slurry of wet-milled, calcined, pigment titanium dioxide, the hydrated aluminum oxide suspension being added in an amount equivalent to 1% $Al_2O_3$ on the basis of the titanium oxide weight. The slurry was then filtered, and the hydrated aluminum-oxide-treated pigment was then dried and disintegrated as was Sample 2-A. This product was designated as Sample 2-C.

EXAMPLE III

To a portion of a slurry of calcined, wet-milled, dispersed, pigment titanium dioxide, containing 350 lbs. TiO2 in 235 gallons water, was added 1.375 liters of a basic aluminum acetate solution containing basic aluminum acetate in an amount equivalent to 159 grams Al2O3, i. e., the basic aluminum acetate was added in an amount equivalent to 0.1% Al2O3 on the basis of the titanium oxide weight. Barium hydroxide was then added to the titanium dioxide dispersion in amount sufficient to raise the pH of the slurry to 10.2, thereby effecting coagulation of the titanium oxide. The coagulated slurry was adjusted to a pH of 7 by the addition of acetic acid thereto; the slurry was then filtered, and the resulting treated pigment was dried at a temperature of 120° C. and disintegrated by passage through a rotary hammer mill. This product was designated Sample 3-A.

A second portion of the same slurry of calcined, wet-milled, dispersed, pigment titanium dioxide was treated in like fashion as the portion used to produce Sample 3-A, except that the basic aluminum acetate solution was added in amount equivalent to 1% Al2O3 on the basis of the titanium dioxide weight. The pigment product so obtained was designated Sample 3-B.

EXAMPLE IV 8.7 parts by weight of a basic aluminum acetate solution containing basic aluminum acetate in an amount equivalent to 0.87 part by weight Al2O3 was added with stirring to an aqueous dispersion of calcined, wet-milled, pigment titanium dioxide having a concentration of 250 grams TiO2 per liter and containing 100 parts by weight of TiO2. 100 parts by weight of an aqueous suspension of calcium hydroxide containing 2.5 parts by weight of Ca(OH)2 was then added, causing coagulation of the titanium dioxide dispersion and raising its pH to 11.0. The slurry was allowed to settle, the supernatant liquor was decanted off, the slurry adjusted to a pH of 6.9 by addition of 13.6 parts by weight of 10% acetic acid and was then filtered. The resulting pigment was then dried at a temperature of 128° C. and disintegrated by passage through a squirrel cage disintegrator. This product was designated Sample 4.

Samples of each of the titanium oxide pigments prepared as in said Examples I-IV and of the 3 standard titanium oxide pigments were formulated in a conventional manner and under identical conditions into enamel paints, comprising a drying oil modified polyhydric alcohol polybasic acid resin baking enamel paint. Pigmentation was in the proportion of 100 parts by weight of titanium oxide to 100 parts by weight of vehicle solids. These enamel paints were then applied, under identical conditions, to metal panels, and the coated panels were then baked for a period of 1¼ hours at a temperature of about 180° C.

The resulting baked films were then graded for baking discoloration. The films containing said three standard samples were arbitrarily given baking discoloration gradings of "3," "10" and "14." The first gave very definite discoloration on baking under the selected conditions and the pigment was therefore considered too poor for use in such type of formulation, due to its tendency to objectionably yellow. The "10" standard discolored (yellowed) on baking and was not considered good enough for use in enamel paints, especially in high quality types wherein yellowing resistance is essential. The "14" standard sample, representing a pigment containing the prior art hydrated alumina-treated product was somewhat better than the "3" and "10" samples with respect to yellowing resistance, but was definitely lacking in essential gloss and gloss retention characteristics. The films containing the TiO2 pigments prepared in accordance with my invention, as described in said examples, were then graded against these standards, a numerical grading being determined by examination and comparison of the baked films. The films were also tested for gloss immediately following baking and again after exposure for approximately one month's time to north light. The gloss determinations were made on a standard Lange photo-electric gloss meter and by the method described at pages 247-248 of the Dr. St. John's translation of Dr. Lange's "Photo-elements and their Application" (published in 1938 by Reinhold Publishing Corporation), the deflection of the needle of the gloss meter being adjusted to read "100" for a standard sample of polished black glass. One set of the so-prepared baked enamel paint coated panels were exposed outside for one month on a vertical Delaware test fence facing south, and were periodically examined at the end of two weeks' and one month's exposure. The numerical values obtained for baking discoloration and for gloss, together with the chalking and yellowing gradings of the films exposed in Delaware, are recorded below:

Table

| Pigment sample | Percent Al2O3 on pigment | Baking discoloration | Gloss | | Delaware outside exposure | | | |
|---|---|---|---|---|---|---|---|---|
| | | | Immediate | After exposure for one mo. | Two weeks | | One month | |
| | | | | | Yellowing | Chalking | Yellowing | Chalking |
| 1-A | 0.054 | 16 | 68 | 60 | Slight | Slight | Appreciable | Considerable. |
| 1-B | None | 3 | 40 | 30 | Considerable | Considerable | Very bad | Very bad. |
| 2-A | 0.23 | 20 | 73 | 65 | None | None | Very slight | Appreciable. |
| 2-B | None | 3 | 40 | 30 | Considerable | Considerable | Very bad | Very bad. |
| 2-C | 1.0 | 17 | 31 | 22 | None | None | Very slight | Appreciable. |
| 3-A | 0.1 | 19 | 71 | 67 | ...do | ...do | ...do | Do. |
| 3-B | 1.0 | 19 | 72 | 67 | ...do | ...do | ...do | Slight. |
| 4 | 0.87 | 19 | 71 | 68 | ...do | ...do | ...do | Do. |

It will be noted from the above that pigments prepared in accordance with my invention, namely, Samples 1-A, 2-A, 3-A, 3-B and 4, produced films having excellent baking discoloration and gloss characteristics, with satisfactory resistance toward yellowing and chalking. The untreated pigments, namely, Samples 1-B and 2-B, produced films which discolored badly on baking, exhibited poor gloss, and little or no resistance toward yellowing or chalking. The prior art hydrated aluminum oxide pigment, namely, Sample 2-C, produced films which had more desirable baking discoloration and yellowing and chalking resistance properties, but had extremely poor gloss characteristics.

While I have enumerated specific organic aluminum salts and divalent metal hydroxides, together with amounts thereof, as usefully employable in my invention, it is not limited thereto. Accordingly, suitable variance therefrom may be had without departing from its underlying spirit and scope. The beneficial advantages of the invention will be found to accrue only when the employed organic compound consists of a water-soluble aluminum salt of an organic acid, or a mixture thereof, examples of which include normal and basic aluminum acetate, aluminum ethoxide, aluminum lactate, aluminum 1-phenol-4-sulfonate, aluminum potassium tartrate, aluminum aceto-tartrate, alumnol (aluminum naphthol sulfonate) etc. The amount of surface treating agents applied to the pigment under treatment will measure or control the extent of its chalking or yellowing resistance as well as the tinting strength and gloss or gloss retention characteristics thereof. Generally, relatively small amounts are employed ranging, as already indicated, from .01% to about 10%, based on the pigment and calculated as $Al_2O_3$. Higher concentrations, though employable, impart no noticeable or additional beneficial effects to the pigment and hence are not recommended for use. In obtaining optimum benefits under the invention, I prefer to employ amounts ranging from about 0.1% to 1%, calculated as $Al_2O_3$, on the basis of the pigment.

It has been found that as a reacting neutralizing agent water-soluble alkaline earth metal hydroxides, or mixtures thereof, especially those of calcium, strontium and barium, particularly the latter, are especially beneficial and essential for use in the invention. In effecting a reaction between the precipitating agent and aluminum compound, the two reactants may be added, either concurrently to the titanium pigment slurry, or by adding first one reactant and then the other. Preferably, however, the aluminum salt is first added, and then the alkaline earth hydroxide is added. After addition of the aluminum salt and precipitating agent to the pigment slurry, it is essential that the pH of said slurry be not less than about 7, optimum results arising when the pH value is not less than about 9 and up to 11 and the slurry is in coagulated condition.

It is also essential to the invention that the titanium pigment subjected to treatment shall have been previously calcined, preferably in accordance with the methods described in U. S. Patent 1,892,693, and that the after treatment of the pigment shall not be effected under temperatures approximating those of a calcination order. In such after treatment, the pigment slurry may be dewatered in a conventional manner, such as by filtering, following which the aluminum alkaline-earth-metal-treated pigment is dried at a temperature not in excess of substantially 150° C., and preferably of the order ranging from substantially 100 to 120° C.

While I have alluded to the specific treatment of titanium oxide pigments because that comprises a preferred embodiment, the invention is generally applicable to the treatment of all types of titanium pigments, including other white titanium oxide pigments, such as titanated lithopone, metal titanates (particularly those of magnesium, barium, zinc, etc.), and those extended with such materials as calcium sulfate (including insoluble anhydrite), barium sulfate, calcium carbonate, calcium sulfite, barium carbonate, silica, aluminum silicates, magnesium fluoride, sodium fluoride, aluminum fluoride, sodium fluosilicate, sodium aluminum fluoride, magnesium fluosilicate, pachnolite, calcium fluoride, etc.

My process affords many advantages not previously combined in a single process and the product of my process also possesses many advantages not obtainable in prior titanium pigments. When said product is employed in enamel paints of the air drying and baking types, films are provided which not only manifest excellent color, superior tint retention, and high resistance toward yellowing and chalking, but also exhibit excellent gloss and gloss retention characteristics. My basic aluminum acetate treatment is much more effective than prior aluminum hydrate treatment, the measure of its potency being from two to ten times that of hydrate treatment. The great efficiency of my highly basic aluminum precipitate appears to be due to the presence of the organic agent, this being especially evident from the gloss and grit evaluations of a surface-treated pigment of my invention. The presence of the contemplated alkaline earth metal hydroxides advantageously not only raises the pH value of the pigment slurry but acts as a flocculating agent. More important, said hydroxides desirably vary the degree of basicity of the aluminum compound, such as aluminum acetate, whereby that agent becomes converted from a soluble to insoluble form. If salts, such as barium acetate soluble in the supernatant liquid, form during the treatment, these may be readily removed by washing. However, the grit properties of the pigment are in no wise affected by the retention of such soluble compounds and such washing operation therefore may be dispensed with, if desired. This for the reason that such acetates or like organic compounds exert a different effect on paint properties when present in the pigment. Salts, such as barium chloride or sodium or potassium sulfate, formed from inorganic salt treatment would be definitely injurious.

I claim as my invention:

1. A process for improving the discoloration, chalking and gloss and gloss retention characteristics of a previously calcined titanium oxide pigment which comprises admixing with an alkali dispersed, aqueous suspension of said pigment having a pH ranging from about 9 to 11 a soluble aluminum salt of an organic acid to reduce said pH to about 5, thereafter admixing a sufficient amount of an alkaline earth metal hydroxide to raise the pH of the suspension to a pH of from about 9 to 11 and precipitate from substantially .01% to 10% of an insoluble, basic organic aluminum compound, calculated as $Al_2O_3$ and on the pigment basis, on said pigment, thence adjusting the pH of the pigment slurry to about 7, and then drying and recovering the resulting product.

2. A process for stabilizing a previously calcined titanium pigment against discoloration and chalking and for imparting gloss and gloss retention characteristics thereto, which comprises incorporating in an aqueous, alkali-dispersed suspension of said pigment having a pH value of at least 10 a soluble aluminum salt of an organic acid sufficient in amount to reduce said pH to about 5, thereupon incorporating in said suspension a sufficient quantity of an alkaline earth metal hydroxide to adjust the pH value of said suspension to about 9 to 11 and precipitate on said pigment a small amount of an insoluble, basic, organic aluminum compound and then adjusting the pH of the final pigment slurry to from about 7.2 to 7.5 and filtering, washing, drying and recovering the resulting product.

3. A process for stabilizing a previously calcined titanium oxide pigment against discoloration and chalking and for imparting gloss and gloss retention characteristics thereto, comprising incorporating in an alkali-dispersed slurry suspension of said pigment, having a pH value ranging from about 9 to about 11, from about .1% to 1%, calculated as $Al_2O_3$ and on the pigment basis, of basic aluminum acetate to reduce the pH of the slurry to about 5 or 6, thoroughly agitating the resulting mixture, thence admixing therewith sufficient barium hydroxide solution to raise the pH of said slurry to about 9 to 11 to precipitate the aluminum as highly basic aluminum acetate on said pigment and to coagulate said suspension, then further adjusting the pH of the pigment slurry to about 7, and then filtering, drying, and recovering the resulting product.

4. A process for improving the discoloration, chalking and gloss and gloss retention characteristics of a previously calcined titanium oxide pigment comprising admixing with a sodium hydroxide dispersed, aqueous slurry suspension of said pigment having a pH of from about 9 to 11, an amount of basic aluminum acetate equivalent to 0.1% $Al_2O_3$ on the basis of the titanium oxide weight to reduce the pH of said slurry to about 5, thence admixing barium hydroxide with said slurry in amount sufficient to raise the pH value thereof to about 10.2 to precipitate the aluminum as highly basic aluminum acetate on said pigment and coagulate the titanium oxide, adjusting the pH of said coagulated slurry to about 7 by admixing sufficient acetic acid therewith, thence filtering, drying and recovering the resulting product.

5. A process for improving the discoloration, chalking and gloss and gloss retention characteristics of a previously-calcined titanium oxide pigment, comprising admixing basic aluminum acetate with said suspension in an amount ranging from .1 to 1% on the $TiO_2$ basis, and calculated as $Al_2O_3$, thereupon incorporating in said suspension sufficient calcium hydroxide to coagulate the titanium oxide dispersion and raise the pH value thereof to about 11, allowing the slurry to settle, decanting off the supernatant liquor and adjusting the slurry to a pH of about 6.9 by incorporating a sufficient quantity of acetic acid therein, and then drying and recovering the resulting product.

JOHN A. GEDDES.